Dec. 4, 1956     H. B. SHIBLEY, JR     2,772,533
MOWER HAVING LEDGER PLATE WITH COOPERATING
WOBBLE PLATE CUTTER
Filed Jan. 17, 1955
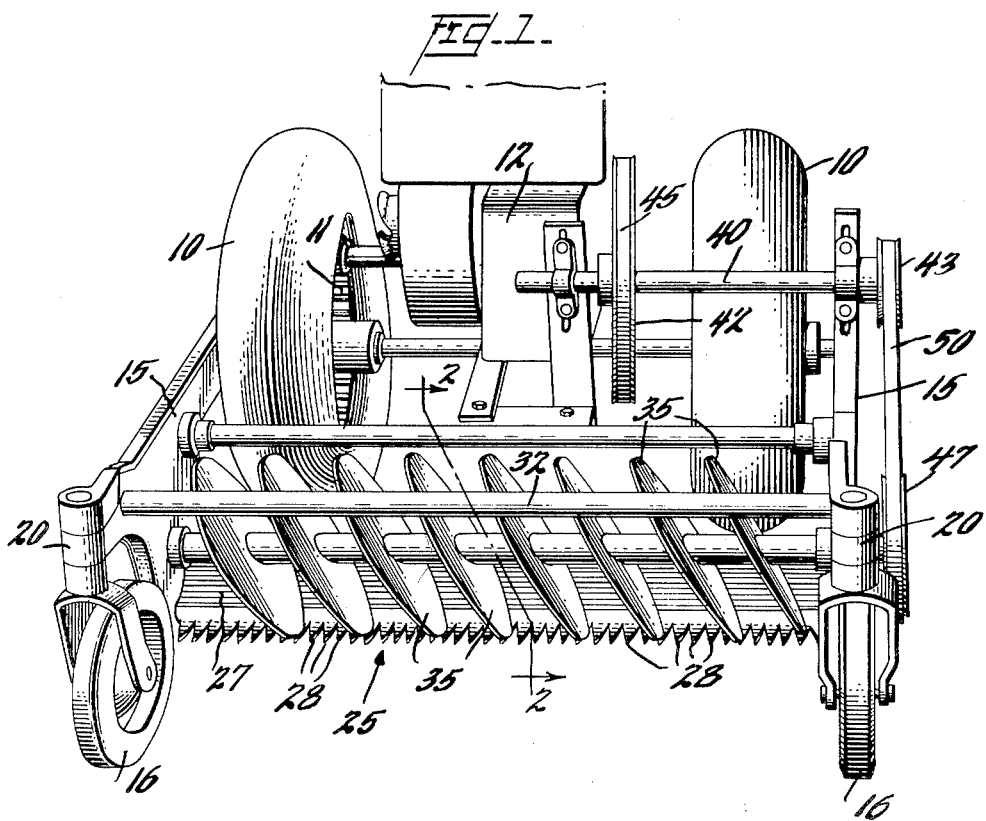
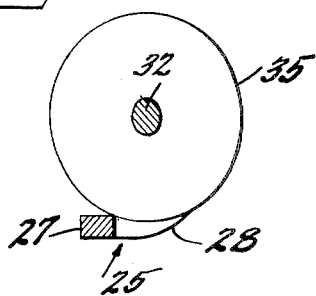
INVENTOR
*Harry B. Shibley, Jr.,*
BY *Watson, Cole, Grindle & Watson*
ATTORNEYS

United States Patent Office 2,772,533
Patented Dec. 4, 1956

2,772,533

MOWER HAVING LEDGER PLATE WITH CO-OPERATING WOBBLE PLATE CUTTER

Harry B. Shibley, Jr., Coffeyville, Kans.

Application January 17, 1955, Serial No. 482,088

1 Claim. (Cl. 56—252)

The invenion relates to improvements in mowers and related equipment for the cutting of grasses and grains and has for its object the provision of novel cutting elements coacting in a unique manner and with greatly increased efficiency.

In the field of lawn mowers, for examples, there are presently two commonly used types of cutting mechanism, each of which is subject to a number of disadvantages and lacking in efficiency for certain applications.

The most common type of mower employs a cutting reel having a plurality of spirally disposed blades co-operating with a substantially straight fixed blade. Inherently the construction is such that tall grasses and grains are not properly cut but are merely flattened down, so that this type of mower has little utility except for the cutting of frequently mowed and short cropped grass.

The more recent rotary type of cutter, having one or more radial blades mounted on a vertical rotational axis is more effective than the reel type of cutter in the cutting of high grass. However, the blades of the rotary cutter become dull quickly, because of lack of coaction with a fixed blade by which some measure of sharpening may be achieved during operation. Furthermore, rotary cutters are unsafe and have been the cause of many serious accidents.

In accordance with the instant invention, it is proposed to provide cutting mechanism for a mower including a transversely extending stationary cutting member, and a rotatable cutting member comprising a transversely extending rotating shaft on which are mounted in spaced relation a plurality of discs, the planes defined by the discs forming with the shaft axis an acute angle. The stationary cutting member is provided at its forward side with a continuous series of forwardly projecting teeth with which the rotating cutting discs cooperate, the upper side of the toothed portion of the stationary member being grooved in a direction parallel to the rotating shaft to engage the discs over a substantial portion of the arcuate periphery of the latter. It will be appreciated that because of the angular mounting of the discs on the rotating shaft, the zone of engagement between the discs and the stationary cutting member is continuously and progressively displaced transversely of the mower and to and fro as the shaft rotates, the discs executing a wobbling motion which serves to propel the grass laterally of the mower into the zone of engagement of the discs with the toothed portion of the stationary cutting member.

The effect of this unique mode of coaction between the rotating and stationary members of the mower is such that grasses and grains of any height may readily be cut, the contacting surfaces are automatically sharpened by the wiping engagement of the cooperating cutting elements, vibration is reduced to a minimum, and the initial cost of construction and the expense of maintenance are kept within reasonable bounds.

Further objects and features of the invention will be apparent from the following description taken in connection with the accompanying drawings, in which Figure 1 is a perspective view from the front, of a mower embodying the principles of the invention;

Figure 2 is a vertical section on the line 2—2 of Figure 1.

In order to simplify the description of the invention and to promote an understanding of the principles involved, reference is made herein to a specific embodiment which is described in detail. It will nevertheless be appreciated that no limitation of the scope of the invention is thereby intended, such modifications and alterations as fall within the purview of those skilled in the art to effect being contemplated as part of the invention.

The invention is illustrated in the drawings as applied to a lawn mower having main driving wheels 10 which may be rotated through gearing 11 from a motor 12 to propel the mower, the driving wheels being supported in a suitable frame including longitudinal side frame members 15 on which the several components of the mower are carried. At the forward end of the side frame members 15 there may be provided smaller guide wheels 16 supporting the load at the forward end of the frame, these wheels being preferably mounted for swiveling action on generally upwright axes to facilitate steering of the mower. Thus the guide wheels 16 may be journalled in suitable bearings carried by castings 20, which are secured to each of the side frame members adjacent their forward ends. The castings 20 also afford support for the cooperating cutting members which extend transversely therebetween.

The lower cutting member 25 comprises a blade-like element 27 having at its forward side a continuous series of forwardly projecting teeth 28. The element 27 may be supported at its opposite ends in the castings 20 for generally vertical adjustment in the conventional manner, adjusting bolts (not shown), threaded in bosses in the respective castings, being operable to depress or raise the blade and the associated toothed portion 28 thereof.

The rotating shaft 32, disposed above the stationary cutting member and parallel therewith, is journalled at its ends in the castings 20 for rotation about a horizontal axis. Mounted on the shaft at spaced intervals in the length thereof is a plurality of cutting discs 35, the planes defined by these discs forming an acute angle with the shaft, so that each disc functions as a wobble plate as the shaft rotates. The discs 35 are eliptical in contour, the outline of the discs being such that when projected on a plane normal to the shaft they appear to be circular, so that continuous engagement between the discs and the toothed portion 28 of the stationary cutting member is maintained as the shaft rotates.

In order that the edge of a given disc 35 may remain in contact with one edge of an engaged tooth as the disc rotates, it is essential that the upper face of the toothed portion of the stationary cutting member be grooved in the direction of its length, the groove being substantially circular as viewed from the end of the stationary cutting element. It will be perceived that during rotation of the shaft, the contact between each disc 35 and the toothed portion 28 of the stationary cutting member will be shifted both transversely of and longitudinally of the frame, moving along the side edge of a tooth and (in the opposite direction) along the contiguous side edge of an adjacent tooth. The desired result may, of course, be achieved by deforming the teeth to arcuate configuration, although the grooving is preferred in the interest of accuracy.

I may rotate the rotating shaft 32 by a belt drive including an idler shaft 40, suitably mounted on the frame for vertical adjustment, and provided with pulleys 42 and 43, pulley 42 being driven from the motor by a belt 45, and pulley 43 driving pulley 47 on shaft 32 through belt 50. However, mowers constructed in accordance with my invention can be operated at high speeds with a minimum of vibration when rotated in any convenient manner from the propelling motor.

As the result of the rotation of the rotatable cutting member, the discs deflect the grasses or other material to be cut laterally of the mower and into the cutting zone, where the material is efficiently sheared.

It will be perceived that since the discs 35 are of appreciable thickness at their periphery, care must be exercised in grinding the same to insure that the substantially flat peripheral edge properly coacts with the toothed portion 28 of the stationary cutting member. This may be effected by grinding the peripheral edges of all of the discs simultaneously by means of a cylindrical grinder supported for rotation on an axis parallel to the shaft axis, the shaft and the grinding cylinder being rotated while in grinding contact.

The spacing of the discs on shaft 32 should be such that the discs overlap as viewed in plan, so that the entire length of the stationary cutting member is contacted by the discs during one rotation of the rotating cutting member.

Considerable modification of the preferred shape of the blades 35 is possible without serious impairment of the function of the mower. Thus the discs may be replaced by a cutting element or elements affording roughly equivalent function, such as spiral segments or a continuous spiral blade, or other structure effective to displace the cutting zone laterally of the toothed portion 28 of the stationary cutting member as the cooperating movable member is rotated. The added cost and complexity of such structures is, however, a deterrent factor and the structure specifically illustrated and described is preferred for these and other reasons. Whatever the shape and design of the rotatable cutting elements, care must be exercised to provide for smooth feeding of the uncut grasses into the cutting zone and to avoid any tendency to flatten the grass, as with the conventional reel type of mower. In this connection it is important to provide adequate spacing between the discs and an angular relation thereof to the shaft which is not an excessive departure from the normal. Whatever the structure, it is essential, of course, that the cutting edge of the rotating element be angularly related to planes normal to the axis of rotation.

It will be appreciated that when the mower is intended for use in the cutting of grass and weeds in confined areas and close to obstructions, the guiding wheels may be located rearwardly of the coacting cutting members, so that the zone of cutting action is disposed well forward of the mower. Various other alterations and modifications adapting the mower to specific applications and uses will be apparent to those conversant with this field.

Having thus described the invention, what is claimed as new and desired to be secured by Letters Patent is:

In a mower, the combination with a frame, of a stationary cutting member mounted in said frame and extending transversely thereof, said stationary cutting member being formed to provide a continuous series of forwardly projecting teeth, a rotating cutting member supported in said frame and extending transversely thereof, said rotating cutting member being disposed above said stationary cutting member and comprising a shaft mounted at its ends for rotation in said frame and a plurality of cutting discs mounted in spaced relation on said shaft for rotation therewith, the planes defined by said discs forming an acute angle with the axis of said shaft, said discs being of generally elliptical contour to establish and maintain engagement with the toothed portion of said stationary cutting member as said shaft rotates, whereby the zone of contact between each disc and the said toothed portion is displaced laterally of said frame in opposite directions during rotation of said shaft, the toothed portion of said stationary cutting member being shaped to provide on its upper side a continuous groove extending in parallel relation with said shaft, said groove being shaped to conform to and engage with a substantial length of the periphery of the said discs.

References Cited in the file of this patent
UNITED STATES PATENTS

| | | |
|---|---|---|
| 2,204,254 | Moyer | June 11, 1940 |
| 2,282,238 | Newton | May 5, 1942 |
| 2,484,071 | Brawer | Oct. 11, 1949 |
| 2,526,821 | Jones | Oct. 24, 1950 |
| 2,640,309 | Benson | June 2, 1953 |